United States Patent
Caulk

(10) Patent No.: US 10,888,168 B2
(45) Date of Patent: *Jan. 12, 2021

(54) INTERCONVERTABLE PET STAIRS AND OTTOMAN

(71) Applicant: Jenny E. Caulk, Houston, TX (US)

(72) Inventor: Jenny E. Caulk, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,101

(22) Filed: Dec. 16, 2019

(65) Prior Publication Data

US 2020/0113340 A1    Apr. 16, 2020

Related U.S. Application Data

(63) Continuation of application No. 15/879,870, filed on Jan. 25, 2018, now Pat. No. 10,506,882.

(51) Int. Cl.
| | |
|---|---|
| *E04F 11/06* | (2006.01) |
| *A01K 1/035* | (2006.01) |
| *A47C 7/00* | (2006.01) |
| *A47C 16/02* | (2006.01) |
| *A47C 12/02* | (2006.01) |

(52) U.S. Cl.
CPC ............ *A47C 16/025* (2013.01); *A01K 1/035* (2013.01); *A47C 12/02* (2013.01)

(58) Field of Classification Search
CPC ......... A47B 7/02; A47B 87/02; A47C 16/025; A47C 7/506; A47C 1/024; A47C 1/03294; A47C 7/70; A47C 13/005; B60N 2/68; B60N 2/06; B60N 2/682; B60N 2/22; B60N 2/62; B64D 11/0601; B64D 11/0641; B64D 11/0643
See application file for complete search history.

(56) References Cited

U.S. PATENT DOCUMENTS

| | | | | |
|---|---|---|---|---|
| 2,038,806 | A * | 4/1936 | Sellar | A47C 9/025 248/398 |
| 2,495,374 | A * | 1/1950 | Horn | A47B 79/00 4/476 |
| 3,205,839 | A * | 9/1965 | Norreklit | A47B 7/02 108/91 |
| 3,254,916 | A * | 6/1966 | Bass | A47B 83/02 297/140 |
| 3,488,898 | A * | 1/1970 | Scaggs | E04H 3/123 52/10 |
| 3,536,359 | A * | 10/1970 | Amos | A47C 13/00 297/462 |
| 4,937,902 | A * | 7/1990 | Ceike Shapiro | A47C 29/003 182/34 |
| D360,664 | S * | 7/1995 | Stone | D21/671 |
| 5,638,913 | A * | 6/1997 | Blum | B25H 3/02 182/222 |
| D387,571 | S * | 12/1997 | Schweter | D6/335 |

(Continued)

*Primary Examiner* — Shin H Kim

(74) *Attorney, Agent, or Firm* — Erickson Kernell IP, LLC; John C. McMahon

(57) ABSTRACT

A versatile item of home furniture having multiple sections joined by glides to allow all sections to be nested or encapsulated together in an ottoman configuration or, alternatively, be positioned as steps in a step configuration. The sections may include being in a seating configuration wherein the steps are disengaged from each other and include cushions received in recesses at the tops of the structure.

6 Claims, 5 Drawing Sheets

(56) References Cited

U.S. PATENT DOCUMENTS

| | | | | |
|---|---|---|---|---|
| 5,735,586 A * | 4/1998 | Cheng | ................... | A47B 46/00 182/35 |
| 6,045,193 A * | 4/2000 | Johnson | ................ | A47B 85/00 297/135 |
| 6,296,314 B1 * | 10/2001 | Klein | .................... | A47B 85/04 297/119 |
| 6,679,571 B2 * | 1/2004 | Lawson | ................ | A47B 83/04 312/195 |
| D687,639 S * | 8/2013 | Grotta | ........................... | D6/349 |
| 8,540,326 B2 * | 9/2013 | Moszer | ................. | A47B 67/04 312/111 |
| 8,950,806 B2 * | 2/2015 | Smith | ....................... | B62J 1/14 297/195.13 |
| 9,039,080 B2 * | 5/2015 | Guffey | .................. | A47D 1/106 297/174 CS |
| D794,983 S * | 8/2017 | Peota | .......................... | D6/675.1 |
| 9,844,263 B2 * | 12/2017 | Monteiro | ..................... | A47B 67/04 |
| 9,856,654 B1 * | 1/2018 | Tagart | ...................... | E06C 1/38 |
| 2002/0195907 A1 * | 12/2002 | Lawson | ................... | A47D 5/00 312/198 |
| 2005/0218709 A1 * | 10/2005 | Kneier | ..................... | A47C 7/50 297/423.1 |
| 2007/0227415 A1 * | 10/2007 | Meiners | ............. | A47B 47/0091 108/91 |
| 2008/0164724 A1 * | 7/2008 | Burnett | ............. | B62D 33/0612 296/190.02 |
| 2011/0221240 A1 * | 9/2011 | Shen | ..................... | A47B 83/02 297/140 |
| 2011/0221255 A1 * | 9/2011 | Weber | .................... | A47C 9/002 297/452.21 |
| 2012/0104824 A1 * | 5/2012 | Skahan | ................ | A47C 13/005 297/440.14 |
| 2012/0204769 A1 * | 8/2012 | Meiners | ................... | A47B 7/02 108/64 |
| 2013/0257112 A1 * | 10/2013 | Smith | ....................... | B62J 1/14 297/183.1 |
| 2018/0244500 A1 * | 8/2018 | Ghazanfari | ............. | B66B 23/12 |

* cited by examiner

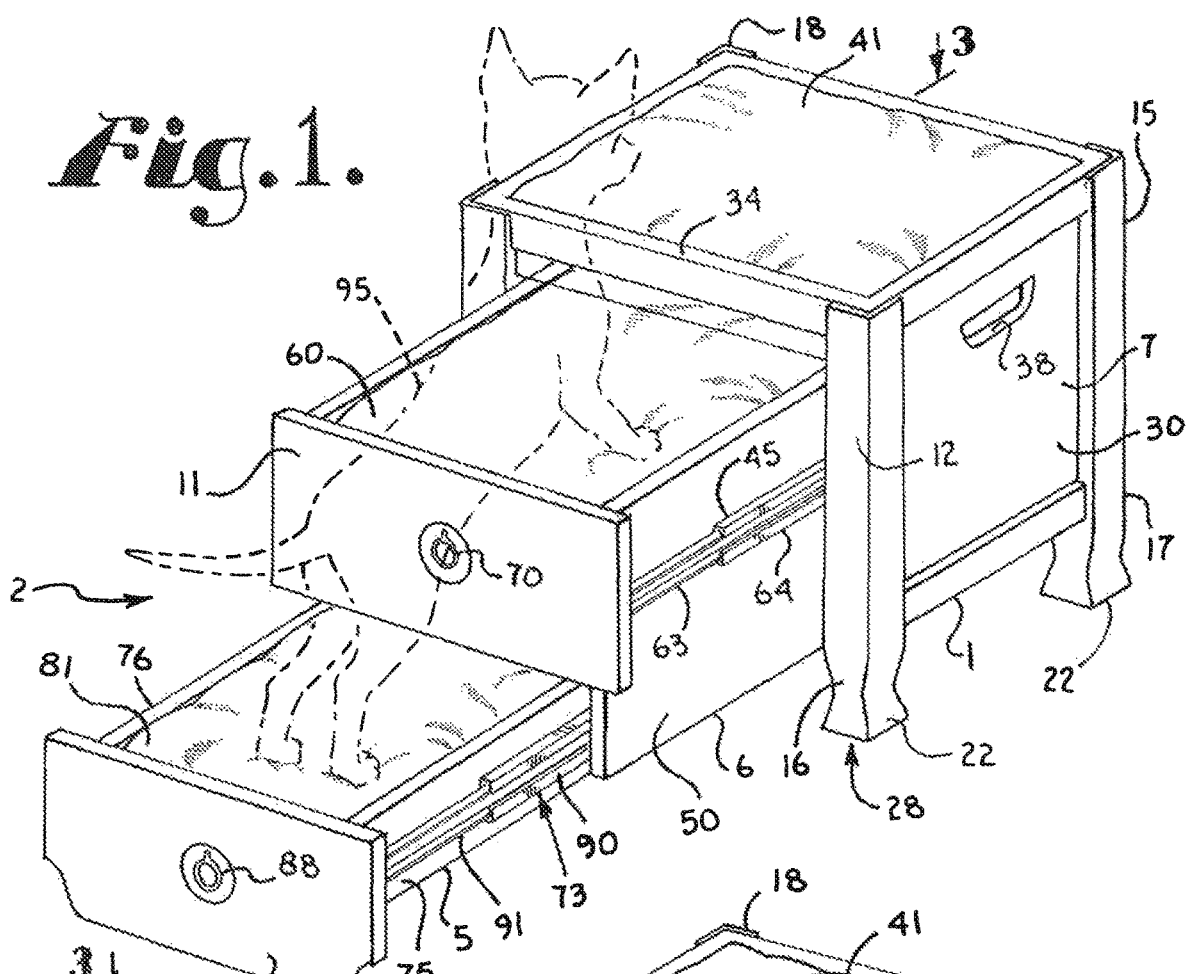

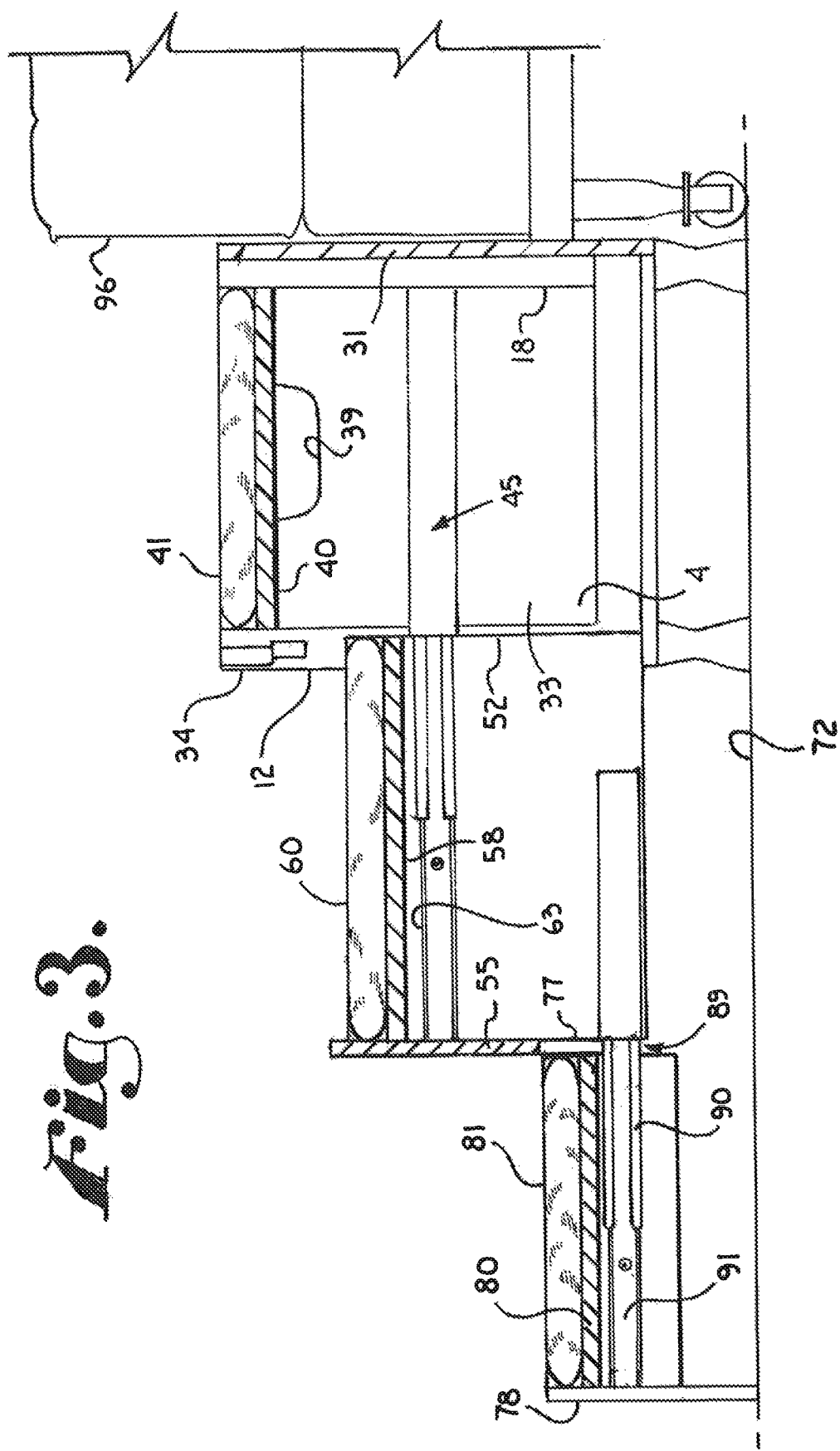

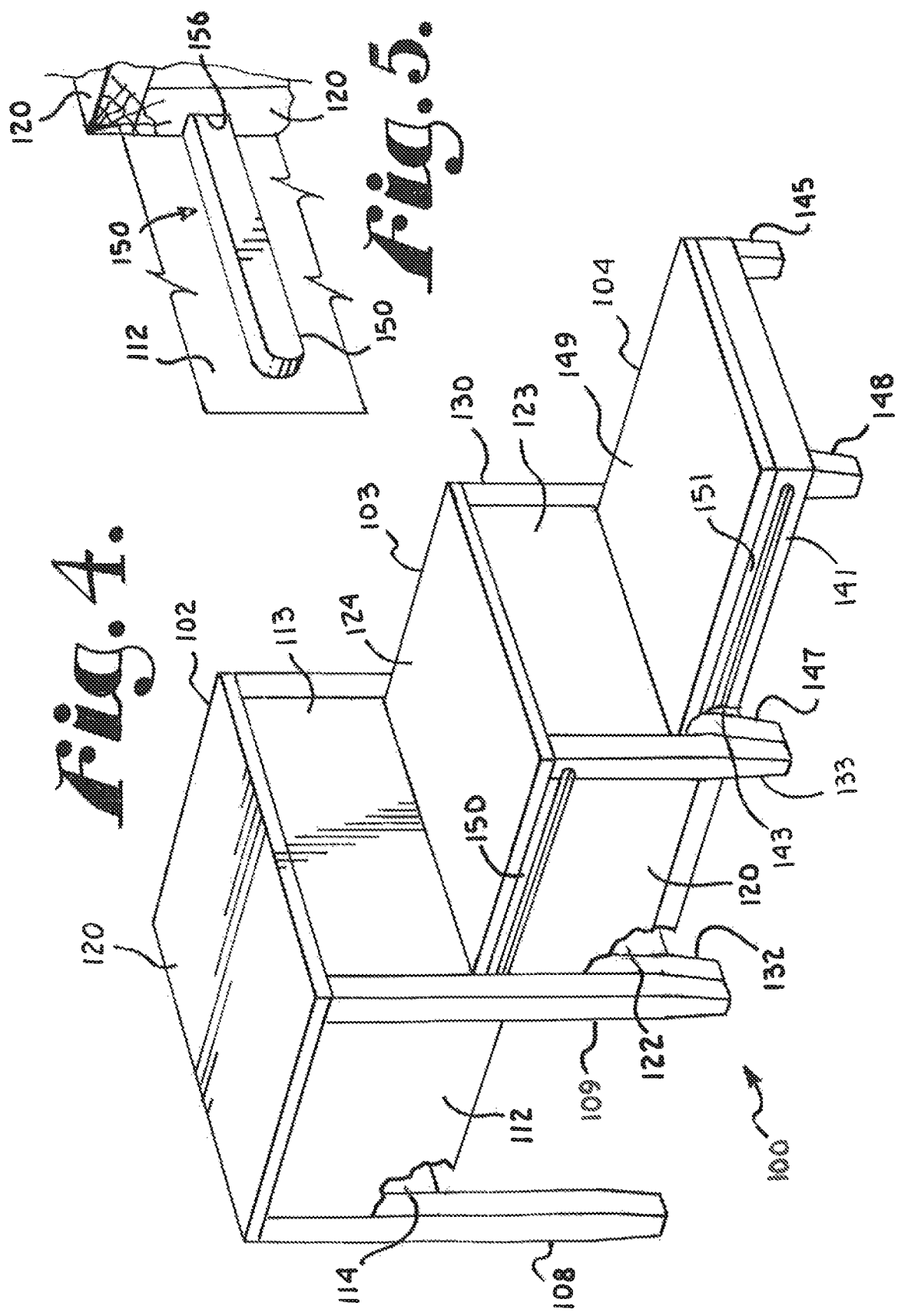

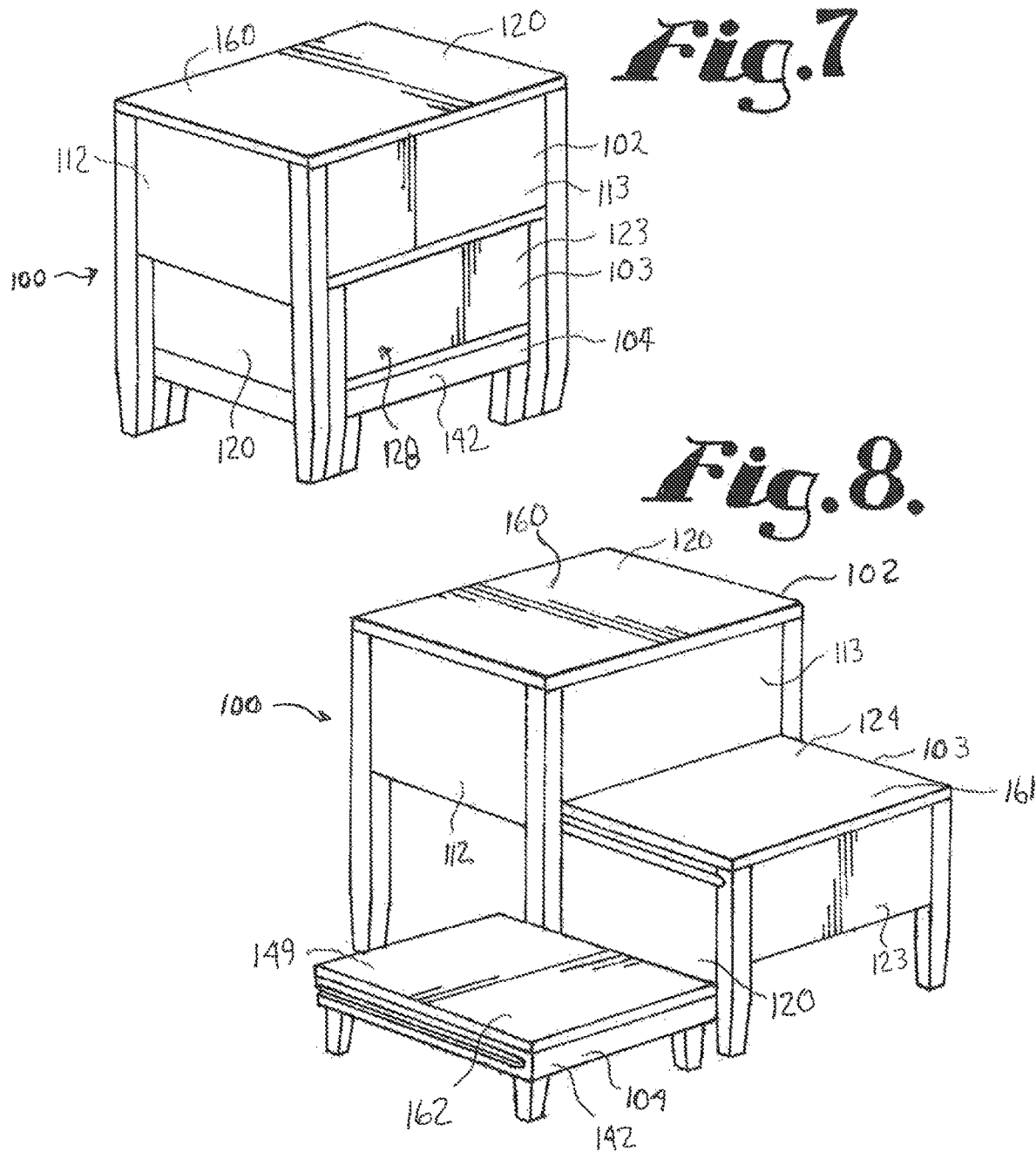

INTERCONVERTABLE PET STAIRS AND OTTOMAN

CROSS-REFERENCE TO RELATED APPLICATIONS

This application is a continuation of U.S. application Ser. No. 15/879,870, filed Jan. 25, 2018, which is incorporated by reference herein.

BACKGROUND OF THE INVENTION

The invention relates to versatile furniture that easily converts between a pet friendly stairs, an ottoman like apparatus and/or independent seating.

In any household there are surfaces of different heights. Many people who have animals, such as dogs and cats, want to allow access to raised surfaces, such as couches and beds. While large animals in good physical condition can normally jump up to such surfaces, many animals because of smallness in size, age, or physical disability cannot make the jump between the floor and the raised surfaces and because of instability or pain in joints may find it difficult to jump down to the floor from the raised surface.

Furthermore, humans also sometimes have difficulty getting onto raised surfaces. For example, a person with bad knees or a leg injury may find it difficult to get into bed.

Previous attempts have been made to provide steps to both animals and persons to ease the task of climbing up or down with respect to a surface by providing a series of easy to scale incremental steps. Such steps have been problematic because they are often large fixed structures that take up a great deal of space, act as a tripping hazard when not in use, and fail to fit into the decor of a room. Some of these structures also have stability issues making them unsafe for use by pets or humans and/or have significant weight limitations and are designed for only small animals. Prior art steps have also often been cumbersome and/or very heavy, so as to be difficult to move.

A further problem with prior steps has been that such are not versatile. Most only provide a fixed stairway that cannot be adapted to positions in different configurations based upon surrounding furniture or structures or be used for other purposes, such as temporary seating or an end table or other furniture when not in use as a stairway.

SUMMARY OF THE INVENTION

An apparatus has multiple sections that are reciprocally receivable in one of the sections to be easily moveable by manual manipulation between an ottoman configuration wherein the apparatus mimics a piece of conventional furniture suitable for resting feet upon when inclined in a chair beside the apparatus or sitting upon and a stair configuration such that a small or disabled animal, such as a dog, can utilize the stairs to move from a floor to an elevated surface such as a top of a bed or couch. The sections are preferably covered by cushions that are received in recesses in the top of the sections. The sections also are preferably joined to one another by glides that allow easy and smooth movement therebetween. Preferably, the sections can be easily disengaged from one another at the glides to provide independent seating in a seating configuration.

An apparatus convertible between an ottoman and a stairs comprising a first, second, and third sections; the first section being longer than the second and third sections and including four spaced legs and a top; the second section being reciprocally received between the legs of and beneath the top of the first section; the second section having includes four spaced legs and a top; the third section being sized to reciprocally be received between the legs of an beneath the top of the second section; the third section having four legs and a top; the second section being mounted on a first glide mechanism relative to the first section; the third section being mounted on a second glide mechanism relative to the second section; the first and second glide mechanisms each having first and second portions that are disengageable from one another to allow the first section to extend outward from the second section and the second section to extend outward from the third section in a stair configuration form an ottoman configuration and, thereafter, for the first and second glide portions to separate from one another such that the first, second, and third sections are independent from each other and form an independent seat configuration.

An apparatus having convertible between an ottoman configuration and a stairs configuration comprising a first and second sections; the first second providing a base with four spaced ground engaging legs and a frontward opening forming an otherwise enclosed receiving area; the second section being reciprocally received within the receiving area of the first section so as to be substantially fully received in the first section; the second section being mounted on the first section on glides on each side thereof that allow the first section to reciprocate into and out of the first section so that when outside the first section, the apparatus is in the stair configuration and when inside the first section, the apparatus is in the ottoman configuration; and each of the first and second sections have a top with a cushion thereon.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a stair-ottoman apparatus, shown in an expanded or stair configuration with a dog thereon in phantom.

FIG. 2 is a perspective view of the apparatus, shown in a nested or ottoman configuration.

FIG. 3 is a cross-sectional view of the apparatus as shown in FIG. 1, taken along line 3-3.

FIG. 4 is a perspective view of a second embodiment of a stair-ottoman apparatus with sections thereof in an expanded or stair configuration thereof.

FIG. 5 is a perspective view of the apparatus with portions broken away to show detail of a tongue and groove glide thereof.

FIG. 7 is a perspective view of the second embodiment shown in FIG. 4 with the sections thereof in a nested or ottoman configuration.

FIG. 8 is a perspective view of the second embodiment shown in FIG. 4 with two sections expanded in a partial step configuration with a third section disjoined from the other two sections and positioned to the side to produce an L-shaped step configuration.

DETAILED DESCRIPTION OF THE INVENTION

Figure 6:
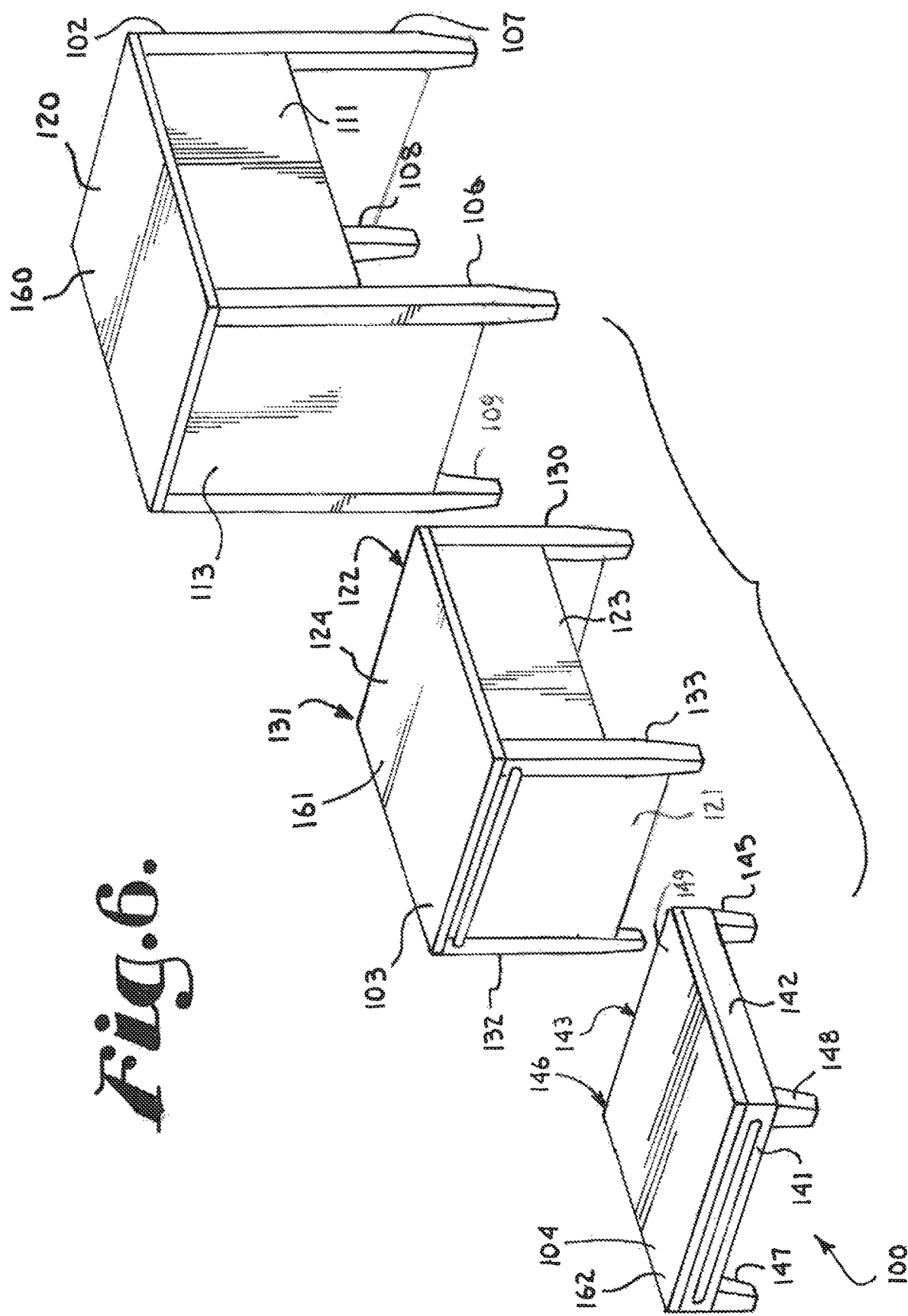
FIG. 6 is a perspective view of the second embodiment shown in FIG. 4 with the sections thereof in a disengaged or seating configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a multi functional piece of furniture or stair-ottoman. In FIG. 1, the furniture 1 is shown in a first or step configuration that provides steps 2 for a dog, cat, or other animal and can also function to assist a human onto a bed or the like. In FIG. 2, the furniture 1 is shown in a second or nested configuration as an ottoman 3 for support of feet when a person is in a reclining position or to sit upon.

More specifically, the furniture 1 includes three nestable or collapsible sections 5, 6, and 7. In the second configuration (FIG. 2), the sections 5 and 6 are received into a cavity 4 in the third section 7 such that all three sections 5, 6, and 7 have common front panels 10, 11, and 12 that generally vertically align with one another and form an almost planar overall front except for various design structural ridges, depressions and the like. The front panel 10 extends downward to support structure that the furniture 1 rests upon for added support and to resist tipping, especially when in the stair configuration of FIG. 1.

The section 7 provides a base 15 for the piece of furniture 1 and includes four legs 16, 17, 18 and 19 that each have feet 22 that have bottom support surfaces 28 that are commonly planar with one another to set stably on a planar surface without rocking so as to appear stable to an animal using the stairs 2 and be pet friendly. A first vertical panel 30 fixedly joins the legs 16 and 17. A second vertical panel 31 fixedly joins the legs 17 and 18. A third vertical panel 33 fixedly joins legs 18 and 19. A cross member 34 joins the tops of legs 16 and 19 and is spaced above the section 6 when the sections 5 and 6 are nested in section 7, as seen in FIG. 2. The legs 16, 17, 18, and 19 are vertically aligned and form corners of a structurally rigid or solid rectangle along with panels 30, 31, and 33, as well as the member 34. Hand holds 38 and 39 are located near the upper sides of each of the panels 30 and 33, respectively.

A seat panel 40 joins the legs 16, 17, 18, and 19, as well as the panels 30, 31, and 33 along with the member 34 near the upper end of each. The seat panel 40 receives a cushion 41. The cushion 41 is countersunk relative to the remainder of the section 7 so as to be received on and supported by the seat panel 40 and extend to the top of or slightly above the panel 30, 31, 33, and member 34. The cushion 41 is especially constructed to provide an animal a soft place to step or lay. It is foreseen that the cushion 41 may be upholstered to the seat panel 40 and/or may be removable relative to the sunken seat panel 40. The cushion 41 may be constructed or treated to have properties which withstand traffic from pets and people.

Intermediately along the facing sides of panels 30 and 33 is located a glide or track 44 that is adhered thereto. While it is foreseen that the track 44 could be many different types of structures, the track 44 of the present embodiment is a metallic slider mechanism 45 of the type sometimes found for supporting and guiding drawers of a desk or the like. Each mechanism 45 has a first horizontally aligned portion 46 fixedly attached to respective panels 30 and 33.

The section 6 has opposed side panels 50 and 51 as well as a rear panel 52. The section 6 also has a front panel 55 that is the width of the spacing of the legs 16 and 19 and has a height that effectively extends between the section 5 and the member 34.

The second section 6 also has a seat panel 58 joining and located with a slight spacing below the tops of panels 50, 51, 52, and 55. Positioned on top of the seat panel 58 is a cushion 60 that extends to near the tops of or slightly above the tops of the panels 50, 51, 52, and 55. A second portion 63 of each of the glides 45 is horizontally aligned and attached to respective outwardly facing sides of the panels 50 and 51. The respective glide portions 46 and 63 are in turn joined by a third portion 64 that allows the portions 45 and 63 to be horizontally moved toward or apart and reincorporate with each other and the portion 64. The front of the front panel 55 has a pull 70 that can be manually operated by a human to pull the section 6 out of the section 7 (as seen in the configuration in FIG. 2 to the configuration in FIG. 1).

The section 6 of this embodiment does not touch a floor 72 during normal use. The section 6 has a slider mechanism 73 with a first portion 89 attached to inner facing surfaces of the panels 50 and 51.

The section 5 has side panels 75 and 76, a rear panel 77 and a front panel 78. The front panel 78 extends downwardly to a floor 72, as seen in FIG. 3, to provide stable support for the piece of furniture 1 when in the stair configuration seen in FIG. 1. The panels 75, 76, 77, and 78 have top surfaces that are co-planar. Attached to and positioned slightly below tops of the panels 75, 76, 77, and 78 is a seat panel 80. Located on the seat panel 80 is a cushion 81 that extends to or slightly above the tops of the panels 75, 76, 71, and 78. A pull 88 is located in the front of panel 78. Attached to and extending horizontally along the side panels 75 and 76 is a second portion 90 of the mechanism 73 which is reincorporately joined to a third portion 91 of the mechanism 73, along with the first portion 89, allows the section 5 to be moved relative to the section 6 between the stairs configuration of FIG. 1 and the ottoman configuration of FIG. 2.

It is foreseen that the furniture 1 can be constructed of wood, plastic, metal or other suitable materials. It is also foreseen that the furniture 1 could be attached to or be other structures, such as end tables, night stands, dressers, or the like or could have more or less than three sections, such as 2 or 4.

It is also foreseen that a lock mechanism or stop, such as hook and eye devices, could be provided to receive the sections 5, 6, and 7 in either the stair configuration or ottoman configuration to provide stability. Such a lock mechanism could also be a compact catch, including magnets or non-magnetic devices.

In use, the piece of furniture 1 is utilized as an ottoman or seat 3 in the ottoman configuration shown in FIG. 2, allowing a user to rest feet on it or sit on it. The handles 38 and 39 allow easy placement of the furniture 1 in different locations, as it is needed. The sections 5 and 6 are extendible on the mechanisms 44 and 73 between the stair configuration show in FIGS. 1 and 3 and the ottoman configuration shown in FIG. 2. After extending to the stair 3. A dog 95 or other user can use the cushions 41, 60, and 81 as steps to pass from the floor 72 to a higher structure, such as the illustrated bed 96, in FIG. 3. The cushions 41, 60, and 81 can also be used by a dog or the like to lay on. The stability provided by the four legs 16, 17, 18, and 19, as well as the bottom of the panel 78 puts animals at ease, so that they are not afraid to use the stair 3 for going up or down between higher and lower levels.

The reference numeral 100 generally indicates a second embodiment of a stair ottoman combination piece of furniture or apparatus. The apparatus 100 has three sections 102, 103, and 104.

The section 102 has four spaced vertical or upright legs 106, 107, 108, and 109 joined by a pair of side panels 111 and 112, a front panel 113, and a rear panel 114. A top panel 120 is joined to the tops of the panels 111, 112, 113, and 114, as well as the legs 106, 107, 108, and 109 to form a rigid support with the top panel 120 being generally planar and providing a sturdy and stable support surface. Each of the four legs 106, 107, 108, and 109 are sized and shaped to engage a level floor surface at the bottom thereof.

The section 103 is fully receivable beneath the section 102 or extendable therefrom in a step configuration, as shown in FIG. 4. The section 103 has side panels 120 and 121, a rear panel 122, a front panel 123, and a top panel 124. The section 103 also has four spaced legs 130, 131, 132, and 133 at each corner.

The section 104 is likewise fully receivable beneath the section 103 or extendable therefrom as seen in FIG. 4 in the step configuration. The section 104 has side panels 140 and 141, front panel 142, and rear panel 143 joined at corners by legs 145, 146, 147, and 148, as well as a top panel 149. The section 103 is joined with the section 102 by a glide 150 on each side thereof that allow reciprocal movement of the section 103 relative to section 102. Likewise, section 104 is joined to section 103 by a glide 151 on each side thereof.

The glides 150 and 151 are tongue and groove mechanism, as shown in FIG. 5 wherein the tongues 155 slide in the grooves 156. There is no stop on the glides 150 and 151 so that once the sections 104 and 103 extend out from the section 102 sufficient to separate the tongues 155 from the grooves 156, the sections 102, 103, and 104 separate from one another, such as seen in FIG. 6 to form independent seating in a seating configuration. It is foreseen that each glide 150 and 151 could terminate in a releaseable stop that would allow the sections 103 and 104 to extend to the stairs position shown in FIG. 4 and then be released to allow the sections 103 and 104 to separate from the section 102 to form the independent seating shown in FIG. 6.

Each section 102, 103, and 104 has a top surface 160, 161, and 162 respectively suitable as a stair or as seating in different configurations. It is foreseen that the sections 102, 103, and 104 could each have a lower panel and the top panels 120, 124, and 149 could each be hinged to thereby provide a storage area.

In FIG. 7, the sections 102, 103, and 104 are arranged in a closed, nested, or ottoman configuration. In this configuration the width and depth of the stair ottoman combination piece 100 is just that of the section 102 thereby producing a low profile with the top surface 160 being available to support various objects, including human feet.

Shown in FIG. 8, the piece 100 is arranged with sections 103 and 104 attached, but with the section 103 forward of section 102 in a partial step configuration. Section 104 is positioned to the side of section 103 and disengaged therefrom. The sections 102, 103, and 104 thus form an L-shaped step configuration suitable for areas where surrounding space does not allow expansion of the steps in the step configuration shown in FIG. 4 wherein the sections 102, 103, and 104 all remain engaged with one another.

It is to be understood that while certain forms of the present invention have been illustrated and described herein, it is not to be limited to the specific forms or arrangement of parts described and shown.

What is claimed and desired to be secured by Letters Patent is as follows:

1. An apparatus convertible for placement on a floor between a furniture configuration without exposed stairs and a stairs configuration with exposed stairs comprising:
    a) first and second sections;
    b) the first section providing a base with a front, a rear and spaced sides; the base configured and shaped such that, when in the stairs configuration, a portion of the base engages the floor near the front and rear of the base on both sides of the base; the base having an opening into a receiving area;
    c) the second section being reciprocally received within the receiving area of the first section so as to be substantially fully received in the first section and having sides that engage the floor near both the front and rear thereof;
    d) the second section being mounted on the first section by glides on each of the sides thereof that allow the first section to reciprocate into and out of the first section so that, when outside the first section, the apparatus is in the stairs configuration and when inside the first section, the apparatus is in the furniture configuration; and
    e) each of the first and second sections have a top.

2. The apparatus according to claim 1 wherein:
    a) the first and second sections each have a front panel and when the first and second sections are in the furniture configuration, the first and second panels align vertically to form a generally planar outer surface.

3. The apparatus according to claim 1 wherein:
    a) each of said glides comprise a tongue and groove mechanism.

4. The apparatus according to claim 1 wherein the first and second sections are fully disengageable from each other.

5. The apparatus according to claim 1 including:
    a) a third section that is fully receivable in the second section when in the furniture configuration and that forms a third stair with the first and second sections when extended outward from the second section so as to be in the stairs configuration.

6. An apparatus convertible between an item of home furniture in a furniture configuration and a stairs configuration comprising:
    a) first, second, and third sections;
    b) the first section being larger than the second and third sections and including a front, a rear, a top, and spaced sides; the first section sides configured to engage a ground surface near both a front and a rear thereof when in use;
    c) the second section being reciprocally received between the sides of and beneath the top of the first section; the second section having two spaced sides and a top that are adapted to engage the ground surface during use;
    d) the third section being sized to reciprocally be received between the sides of and beneath the top of the second section; the third section having two spaced sides and a top;
    e) the second section being mounted on a first glide mechanism relative to the first section;
    f) the third section being mounted on a second glide mechanism relative to the second section;

g) the first and second glide mechanisms each having first and second portions that are horizontally moveable relative to each other to allow the first section to extend outward from the second section and the second section to be reciprocally moveable between the stairs configuration and the furniture configuration; the first and second glide portions being disengageable from each other in the stairs configuration so as to allow the glide portions to separate from one another such that the first, second, and third sections become independent from each other and form an independent seat configuration.

* * * * *